May 15, 1962  E. E. VIELLE  3,035,261
TRANSPONDER RANGING APPARATUS
Filed May 5, 1959  6 Sheets-Sheet 3

INVENTOR:
EUGENE EMILE VIELLE
BY
Richardson, David and Nardon
ATTYS.

May 15, 1962     E. E. VIELLE     3,035,261
TRANSPONDER RANGING APPARATUS
Filed May 5, 1959     6 Sheets-Sheet 4

INVENTOR:
EUGENE EMILE VIELLE
By
Richardson, David and Nordon
ATTYs.

# United States Patent Office 3,035,261
Patented May 15, 1962

3,035,261
TRANSPONDER RANGING APPARATUS
Eugene Emile Vielle, Tilford, England, assignor to Avel
Corporation Geneva, Geneva, Switzerland
Filed May 5, 1959, Ser. No. 811,127
Claims priority, application Great Britain May 12, 1958
10 Claims. (Cl. 343—6.5)

This invention concerns improvements in transponder ranging and warning devices, more particularly for use in the avoidance of collisions between moving vessels, such as ships and aircraft.

In the co-pending application 690,377, now U.S. Patent No. 2,980,908, granted April 18, 1961 there was disclosed a method of using transponder techniques to determine whether another vessel was present at the same height (in the case of aircraft) and within a range short enough to constitute a collision risk.

It is the object of the present invention to provide transponder ranging apparatus in which the warning range is closely linked to the velocity of approach so that warning may be given to the pilot or additional apparatus may be brought into action at an estimated time from possible collision which approaches the minimum necessary time and so that warnings are not given when the time for taking avoiding action is so great that in all probability the situation will resolve itself without the aircraft coming into dangerous proximity. The additional apparatus referred to may determine the bearing and may be used to exchange course and speed so as to perform an accurate computation of the collision risk.

According to this invention there is provided transponder ranging apparatus for vessels comprising a responder and interrogator; in the interrogator, transmitter means for sending an interrogation signal; in the responder, receiver means for receiving the interrogation signal, delay means to impart to the interrogation signal a delay in dependence upon the direction from which it was received and for passing such delayed signal to a transmitter for transmission as a response signal; and, in the interrogator, receiver means to receive the response signal, means to impart to such received response signal a delay in dependence upon the direction from which it was received, and means to accept or reject the response signal in dependence upon the total delay between the interrogation signal and the delayed response signal as a measure of the potential danger.

In addition to the delay due to the direction from which the signals are received, delays may also be imparted due to velocity or any other factor which determines the manoeuvre time available. Moreover, in the case of aircraft, it may be convenient to code the signals with height in order to prevent responses being initiated in or received from aircraft at widely different heights.

In the simple form of range measuring device described in the said co-pending application, one aircraft sends out an interrogation pulse and receives responses from those aircraft which are within range, this range being determined by the power radiated by the various aircraft, the sensitivities of the various receivers, the directional properties of the antennae and their shielding by the aircraft, and the propagation conditions. However, those responses which arrive more than a certain time after the emission of the interrogation pulse are disregarded, since they must relate to aircraft at a range so great that there is no immediate collision risk. The range determined by this sorting process must be sufficiently great to allow for the possibility of two very fast aircraft approaching head on, in which case the approach velocity is very high indeed.

It is convenient to assume that warning of imminent collision may be given one minute before such collision will take place for all aircraft speeds, in order to give time for escape manoeuvres. Then, for example, two aircraft approaching each other head on and each travelling at 1,000 miles per hour, must be given warning when they are 33 miles apart. However, in the case of one aircraft overtaking another of nearly the same speed, such long range warning is pointless since a long time must elapse before the overtaking aircraft is liable to collide with the other aircraft. Thus, if the speeds differ by 100 miles per hour, at the same range of 33 miles the warning would be given 20 minutes before there was a possibility of collision.

It will now be understood that the present invention provides a different warning range, and hence a different maximum time for accepting responses, in dependence upon whether interrogations and responses are received from the front or rear sector. Thus warning is given at the maximum possible range only if the interrogating aircraft and the responding aircraft are both within the forward sector of the other aircraft. One method of carrying the invention into practice is to provide for the responding aircraft to receive the interrogation on one of two antennae, one receiving mainly from a sector forward of the aircraft, and the other receiving mainly from a sector to the rear of the aircraft. Each antenna may feed its own separate receiver and different artificial delays may be introduced between the receiver outputs and a single combined output connected to the responder transmitter, the delay being less for the forward sector than for the rearward. Similarly, the interrogating aircraft may receive the response on one of two antennae, with different artificial delays, the delay for the forward sector again being less than that for the rearward sector.

The delays may be fixed or variable. In the case of fixed delays, the delay for the forward sector for a given type of aircraft may conveniently correspond to the maximum or cruising speed of that type of aircraft, while the delay in the rearward sector may correspond to the minimum speed. Preferably however the delays will be varied automatically in dependence upon the actual speed of the aircraft, the forward delay decreasing, and the rearward delay increasing, with increase of speed. As is usual, responses reaching the interrogating aircraft after more than a predetermined time are ignored.

Under certain circumstances it may be very convenient to be able to derive the true range in addition to the delay modified range of this invention; thus, for example, it may be convenient to use the same apparatus for measuring the distance of an aircraft from a fixed beacon, for example, in a control zone. Provision may therefore be made for switching out the delays under the control of the pilot or the apparatus of the present invention may be associated with undelayed apparatus. One convenient facility which is then achieved is the provision of automatic glide path or take-off control which will enable a pilot to select an angle of descent for the approach to landing or for climb from the runway and to keep to this angle, automatically computing the range and height from the runway.

Thus in accordance with this aspect of the invention, there is provided transponder ranging apparatus for aircraft glide path or take-off control comprising, in the aircraft, an interrogator including transmitter means for sending an interrogation signal; on the ground a responder including receiver means for receiving the interrogation signal and means passing a received signal to a transmitter for transmission as a response signal and for encoding such response signal with the height of the responder; and, in the interrogator, receiver means to receive the response signal, means to determine the range separation between the interrogator and the responder, means to determine the height separation between the interrogator and the responder, means set effectively in accordance with the desired glide angle and means to determine whether the ratio of height separation to range separation is in accordance with the desired glide angle and for signalling this to the pilot.

In order that this invention may more readily be understood, certain embodiments of the same will now be described with reference to the accompanying drawings, in which.

Figure 7:
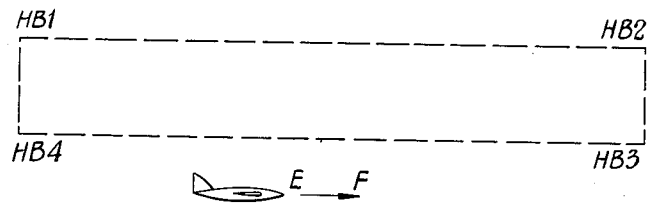
Figure 8:
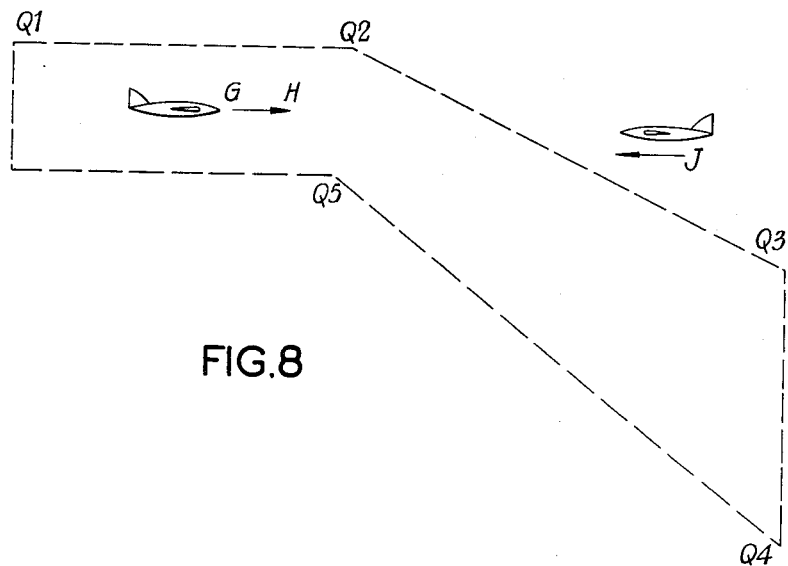
Figure 4:
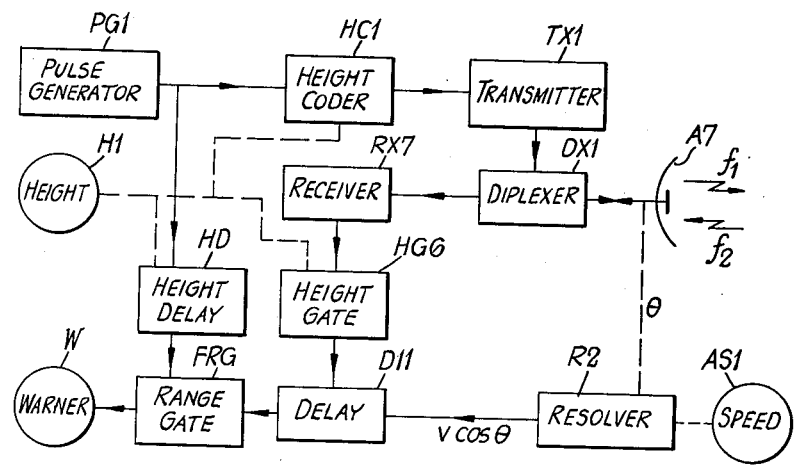
Figure 5:
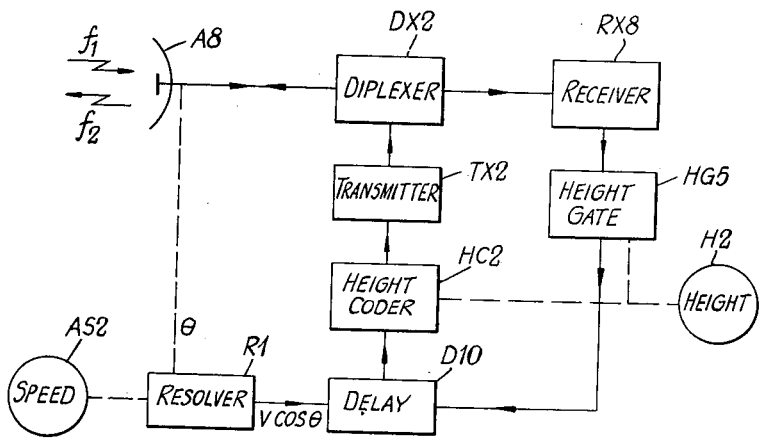
Figure 9:
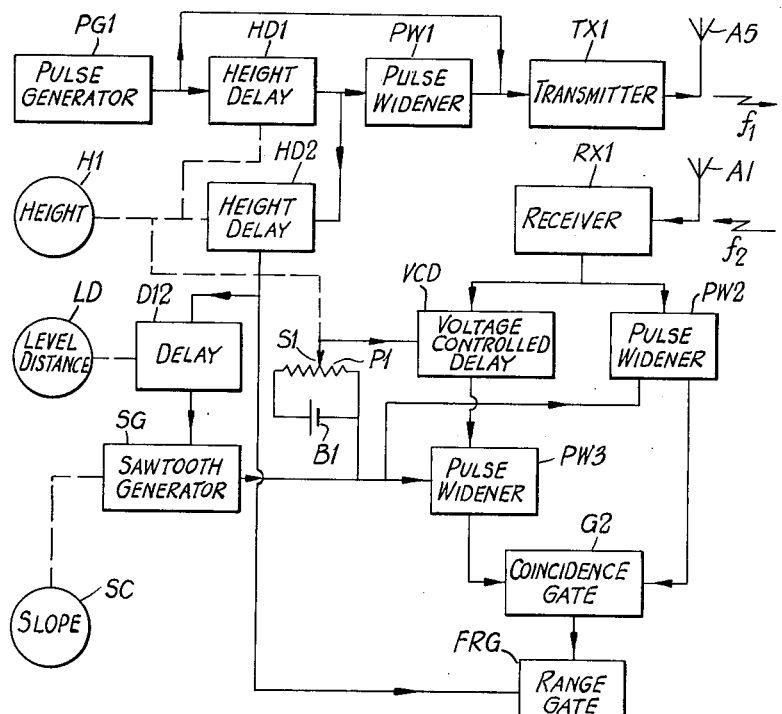
Figure 6:
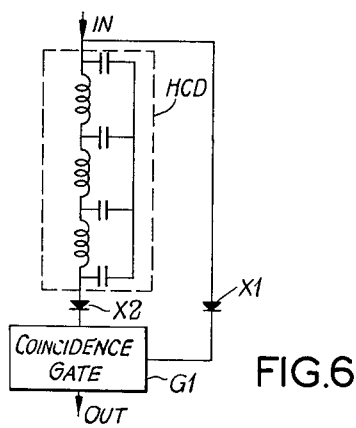
Figure 10:
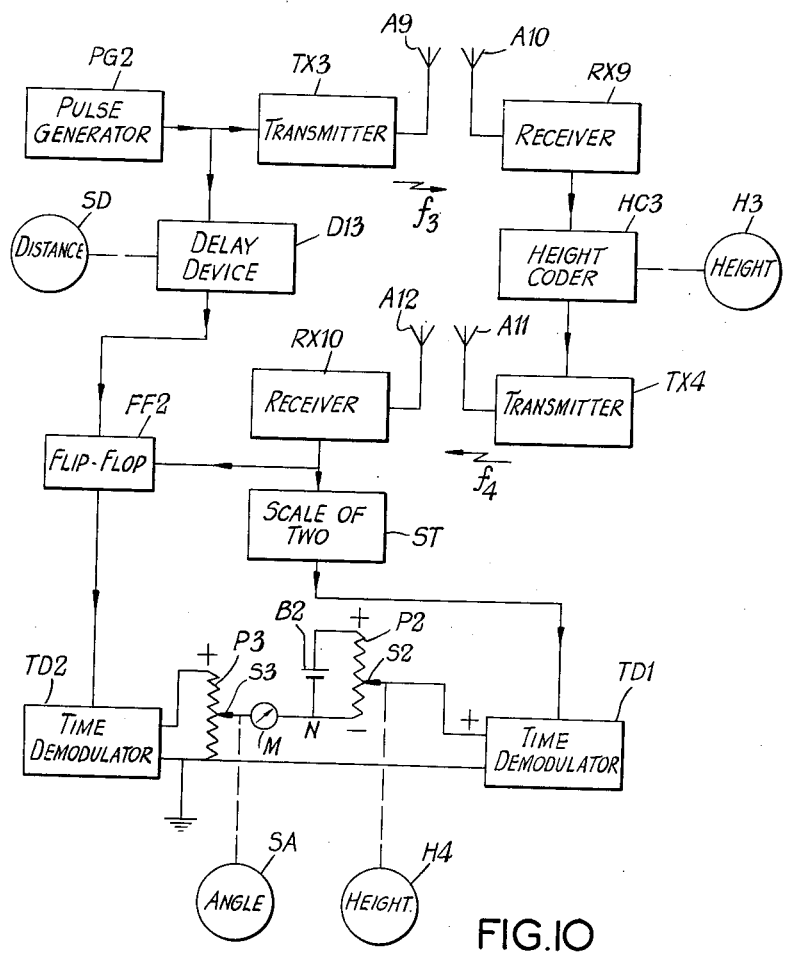

FIGURE 4 shows the apparatus for an interrogating aircraft using a rotating antenna, FIGURE 5 shows the apparatus for a responding aircraft using a rotating antenna, FIGURE 6 shows a height gate, FIGURE 7 illustrates searching at a height band other than that occupied, FIGURE 8 shows the searching of a sloping height band, FIGURE 9 shows apparatus for searching a sloping height band, and FIGURE 10 shows apparatus for glide path control.

Figure 1:
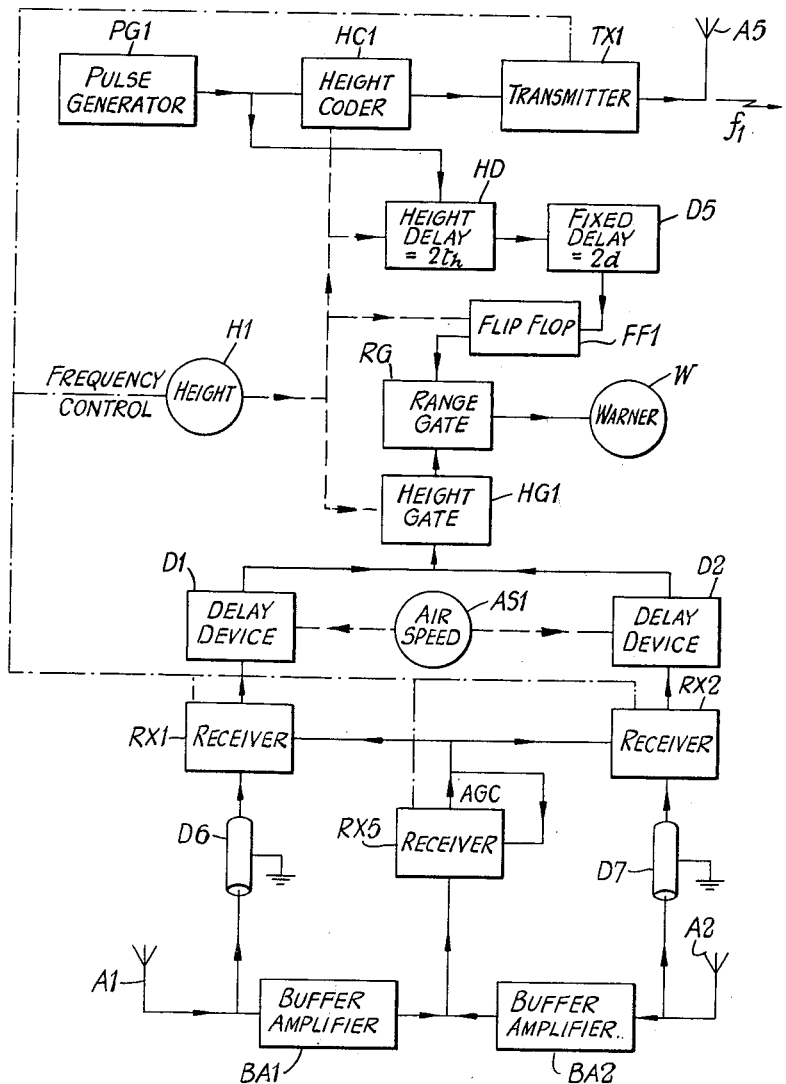
FIGURE 1 shows the apparatus for an interrogating aircraft.
Figure 2:
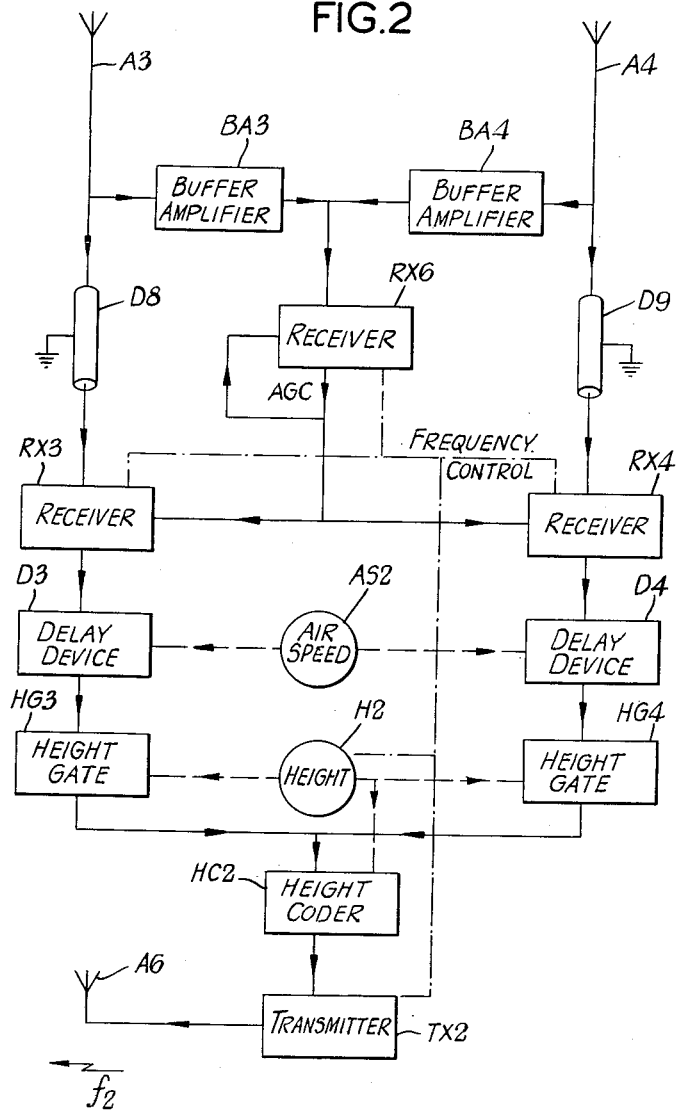
FIGURE 2 shows the apparatus for a responding aircraft.

FIGURE 1 shows in block form the equipment for an interrogating aircraft and FIGURE 2 shows in similar form equipment for a responding aircraft. If an aircraft is fully equipped it will, of course, carry both sets of equipment but light aircraft will carry only that shown in FIGURE 2, for although this does not enable them to take avoiding action it does enable them to co-operate with a fully equipped aircraft.

The interrogating apparatus is illustrated in FIGURE 1 and comprises a transmitter TX1 to which pulses are applied from a pulse generator PG1 via a height coder HC1 which is controlled by a height sensitive device H1, the pulse being passed to an omni-directional antenna A5 to be radiated upon a frequency $f_1$. The pulse repetition frequency is not important, but should be as high as is convenient, bearing in mind the delays which will be imparted to the pulse as hereinafter described. A suitable form of height coding is to convert each pulse into a pair of pulses separated by an interval $t_h$ which is characteristic of height and the device H1 is conveniently a pressure sensitive device such as a pressure capsule which is responsive to the ambient atmospheric pressure at the aircraft. Convenient forms of height coder will be described hereinafter. In any event it should be assumed, for the purpose of the following description, that the antenna A5 radiates a pair of pulses on a frequency $f_1$, such pair of pulses being separated by a time indicative of height.

The responder apparatus is illustrated in FIGURE 2 and comprises a pair of directional antennae A3 and A4, one generally covering the forward sector and the other generally covering the rearward sector, but the two sectors overlapping so as to provide reception from all directions. It will be assumed that the interrogation signals reach the antennae A3 and A4 after a delay of $t_0$ which is characteristic of the time required for the propagation of the signal over the distance between the two aircraft.

Each of the antennae A3 and A4 is connected directly to its own buffer amplifier BA3 or BA4, which buffer amplifiers are jointly connected to the input of a receiver RX6. The antennae A3 and A4 are also connected via fixed delays D8 and D9 to respective receivers RX3 and RX4. The fixed delays D8 and D9 are only short delays and may be constituted, for example, by a few yards of ordinary co-axial cable or a shorter length of delay cable. The receiver RX6 is arranged to amplify and detect the signal to produce an automatic gain control voltage which is used to control the gain of the receiver RX6 and which is also fed to the receivers RX3 and RX4 to control their gains.

When an interrogation signal arrives, both antennae A3 and A4 will receive the signal, except in the rare case where the signal has come from a direction corresponding to a null in one of the polar diagrams. However, in general it will be clear that one of the antennae receives a stronger signal than the other and both the signals are passed to the receiver RX6 via the buffer amplifiers which are used solely to prevent signals from one antenna reaching the other. The receiver RX6 generates an automatic gain control voltage corresponding to the sum of the two signals and thus very approximately corresponding to the strength of the stronger signal. The detector circuits in the receiver RX6 are designed with a very short rise time so as to produce the automatic gain control voltage very quickly after receiving a signal and thus the gains of the receivers RX3 and RX4 are set to values corresponding to the stronger signal before the signals in fact arrive through the delays D8 and D9. The stronger signal produces a standard output from the appropriate receiver, whilst the weaker signal will produce a reduced output and the subsequent apparatus is of such sensitivity that the weaker signal is disregarded.

The outputs of the receivers RX3 and RX4 are respectively connected to delay devices D3 and D4 which are controlled by an air speed servo AS2 so that the delay device D3 produces a delay $t_3$ decreasing as the speed of the aircraft increases and the delay device D4 produces a delay $t_4$ increasing as the speed of the aircraft increases, as described hereinafter.

In the arrangement of FIGURE 2, each delay device D3 and D4 is connected to its respective height gate HG3 or HG4 but a single height gate may be used, such as the height gate HG1 illustrated in FIGURE 1. These height gates are set by a height sensitive device H2 and it is arranged that the pair of pulses arriving at the input to the height gate leaves the output of the height gate as a single pulse if the height coding is appropriate, whilst no pulse leaves the output if the height coding is inappropriate.

Assuming that the stronger signal has been received by the antenna A3, then the input to the height gate HG3 will be a pair of pulses separated by a spacing indicative of height, the first pulse arriving at a time $t_0+d+t_3$ after transmission, where $d$ is the delay imparted separately in each channel by the respective delays D8 and D9. The output from the height gate HG3 will be a single pulse arriving at a time $t_0+d+t_3+t_h$ after transmission.

The outputs from the two height gates HG3 and HG4 are connected to a height coder HC2 similar to the height coder HC1 and controlled by the height sensitive device H2 to generate a double pulse at a spacing indicative of height and this double pulse is passed to a transmitter TX2 of the responder for radiation as a response signal from an omni-directional antenna A6 upon a frequency $f_2$.

The response signal on the frequency $f_2$ requires a time $t_0$ to travel to the interrogator aircraft which (see FIGURE 1) is provided with a pair of antennae A1 and A2, gain setting receiver RX5, associated receivers RX1 and RX2, associated buffer amplifiers BA1 and BA2, associated fixed delays D6 and D7 and associated variable delay devices D1 and D2 controlled by an air speed servo AS1 in the same way as the responder aircraft is provided with this equipment. The delay devices D1 and D2 produce delay $t_1$ and $t_2$ respectively. In consequence, supposing that the reception is made by the antenna A1, a double pulse will appear at the output from the delay device D1, the first pulse appearing after a time $$t_0+d+t_3+t_h+t_0+d+t_1=2t_0+2d+t_h+t_1+t_3$$

after transmission and this double pulse is passed through a height gate HG1 which serves to produce a single pulse if the height code is correct, this single pulse being delayed by a further time $t_h$. Two height gates may be provided as in FIGURE 2. The output from the height gate HG1 is passed to a range gate RG which is opened by a pulse from the pulse generator PG1 and closed after the necessary time representing the maximum delay that is interesting and in the present arrangement the pulses from the pulse generator PG1 are passed to a delay device HD controlled by the height sensitive device H1 so as to introduce a delay of $2t_h$, and is then passed to a fixed delay D5 (similar to D8 and D9) to introduce a delay $2d$. Thus it will be apparent that the delay of $2t_h+2d$ which has been introduced into the response has been taken into account. The delay device D5 feeds a flip-flop or phantastron circuit FF1 to produce a long pulse for the total reception time that is of interest, this pulse being used to control the range gate RG which is a coincidence-type gate. The flip-flop FF1 may be height controlled to provide increased maneuver time at high altitudes.

The antennae A1 and A3 receive from the forward sectors whilst the antennae A2 and A4 receive from the rearward sectors and in consequence it will be understood that the delay $t_2$ is greater than the delay $t_1$ and the delay $t_4$ is greater than the delay $t_3$ for equal speeds. The shortest delay with which the range gate RG will be concerned is a delay of $t_1+t_3$ whilst the longest delay is $t_2+t_4$ which corresponds to the situation where the two aircraft are receding from one another after a nearly head-on approach.

Pulses passed by the range gate RG are used to activate a warner W and in addition or alternatively, to switch on other anti-collision apparatus. It will be understood that warning does not take place at a fixed range but at a range depending on the relative velocity of the two aircraft.

It can be shown that in the case of aircraft travelling on straight line courses, warning should occur a fixed time before collision is due, irrespective of the speed of the aircraft. To take the specific example of a system designed for aircraft having maximum speeds of 1000 miles per hour the delays $t_1$ and $t_3$ for reception from the front may be made equal to $(1000-V)/5.6$ microseconds where V is the speed in miles per hour. For reception from the rear the delays $t_2$ and $t_4$ would be equal to $(1000+V)/5.6$ microseconds.

If the range gate RG is arranged to open, as has been described, after making due allowance for the height coding, then if it gives a warning if the response is received less than approximately 360 microseconds after the range gate opens this will be equivalent to giving a warning approximately one minute from the collision time, more or less independently of the actual speeds of the aircraft in the case of two aircraft flying along the same straight line. If the two aircraft are flying on courses at an angle to each other the signals will be received by either the front or rear antenna depending upon actual courses and relative positions and more than one minute's warning will be given since the relative speed will be lower, but the warning would not be excessive as it would be if the speed dependent delays $t_1$ to $t_4$ were not inserted.

Figure 3:
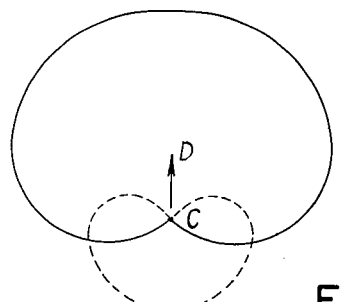
FIGURE 3 shows the polar diagrams of suitable antennae.

Clearly maximum speeds of other than 1000 miles per hour can be allowed for and fixed warning times of other than one minute can be arranged by suitable control of the range gate RG and delays $t_1$ to $t_4$. The delays $t_1$ to $t_4$ are controlled by speed and this may be either indicated air speed, true air speed or ground speed as convenient but it should be understood that it is extremely desirable for all aircraft to use the same parameter. Since it is the relative velocity which is of interest, indicated air speed may be used as it is derived directly from instruments and does not involve any pilot setting. It is not thought that its use will introduce any large errors as drift will be the same for all aircraft within collision range. Fixed delays corresponding to cruising speed (for example) may be used. One form of directional antenna suitable for use in the apparatus of FIGURES 1 and 2 consists of two quarter wave rods, the one being connected to act as the antenna whilst the second is a parasitic reflector for producing a polar diagram of the type illustrated in FIGURE 3. In FIGURE 3 the full line refers to the forward-looking antenna and the broken line refers to the backward-looking antenna for an aircraft at the position C travelling in the direction CD. As a shorter range is adequate in the backwards direction the sensitivity of the corresponding antenna or of its associated received may be reduced as indicated.

In some sideways directions signals may be received through both antennae and as explained the gain setting receivers will operate so that the signal is accepted from that antenna providing the stronger signal. It should, of course, be understood that it is possible to have sideways-looking antennae in addition to the forwards and backwards looking antennae and that in such a case each sideways-looking antenna would be associated with its own receiver and delay device.

The antennae associated with the transmitters and the receivers may be combined into a single antenna by the use of diplexing provided that a suitable choice of frequency is made for the frequencies $f_1$ and $f_2$.

It should also be understood that provided that the pulse repetition frequency used for interrogation is sufficiently high and the rate of rotation is sufficiently low a rotating directional receiving antenna may be employed this having certain advantages but having the attendant disadvantage that the rate of rotation must be such as to ensure that an interrogation signal is received within the necessary limits of time. It will be understood that the maximum pulse repetition frequency is based upon the maximum delay that is accepted by the range gate coupled with the maximum height delay that is imparted by the height coders.

If a rotating antenna is provided, only a single receiver and delay device are required but the value of the delay requires to be varied cyclically in accordance with the direction, relative to aircraft heading, in which the antenna is pointed. Thus the antenna will desirably be very sharply directional and the delay introduced in any direction should be $$\frac{1000-V_r}{5.6} \text{ microseconds}$$

where $V_r$ is the speed of the aircraft resolved in the direction of the antenna at any instant. This may readily be achieved by feeding a voltage derived from the air speed indicator or an air speed servo to a resolver, such as a synchro or cosine potentiometer, which is driven in synchronism with the antenna so as to produce an output of $V \cos \theta$, where $\theta$ is the bearing of the antenna relative to aircraft heading. This voltage output which corresponds to $V_r$ is used to control the delay device which may be of the type described in the British Patent No. 659,007, being operated by a voltmeter or the like or which may be of any other suitable form giving either incremental or continuous changes in delay.

FIGURES 4 and 5 show the equipment that is necessary to modify FIGURES 1 and 2 to use directional rotating antennae and to couple the delay due to speed to the instantaneous bearing of the antennae.

Thus, in FIGURE 4 the pulse generator PG1 produces a train of pulses which are fed to the height coder HC1 controlled by the height sensitive device H1 and thence to the transmitter TX1 and via a diplexer DX1 to a rotating directional antenna A7 for radiation on the frequency $f_1$. The diplexer DX1 may be a transmit-receive switch or a tuned device working on a frequency basis, serving in either case to prevent too much of the transnitter power going to a receiver RX7 which replaces the receivers RX1 and RX2. The directional antenna A7 has a fairly narrow beam in azimuth and is of the type capable of producing a radio beam which rotates in azimuth and thus the whole antenna system may rotate or only a portion of it. Alternatively, the radio beam may be rotated by sending it successively in a number of directions by some form of mechanical or electronic commutation using a plurality of discrete directional antennae.

If there is an aircraft in the direction of transmission, within range and at about the same height, this aircraft which carries the equipment of FIGURE 5 will receive the interrogation on the frequency $f_1$ via an antenna A8 and will pass this signal to a diplexer DX2 similar to the diplexer DX1 and thence to a receiver RX8. The detected pulses are decoded by a height gate HG5 which is controlled by the height sensitive device H2 to produce a single pulse if the received coding is correct. These single pulses are delayed by a delay device D10 which is set in accordance with the speed of the aircraft resolved in the direction in which the antenna A8 is pointing. The delay device D10 may be any suitable delay, for example a magnetic drum delay, in which case a resolver R1 having two input shafts and one output shaft may have its first input shaft positioned by the air speed servo AS2 and its second input shaft positioned by the antenna A8 so that the angular displacement of the output shaft is proportional to $V \cos \theta$, this output shaft being coupled to a magnetic record or playback head in the delay D10 so that the delay between recording and playback is proportional to (constant $-V \cos \theta$) as above described.

Alternatively, the delay device D10 may be an electronic delay such as a phantastron, as described in the co-pending application No. 791,924 in which case the air speed servo AS2 may control a potentiometer to produce a voltage proportional to speed this voltage being fed to the resolver R1 which may be a sine-cosine potentiometer.

The output pulse from the delay device D10 is fed to the height coder HC2 controlled by the height sensitive device H2 and thence to the transmitter TX2 and via the diplexer DX2 to the antenna A8 for radiation as a response signal at the frequency $f_2$.

The response signal received by the antenna A7 (FIGURE 4) is passed via the diplexer DX1 and receiver RX7 to a height gate HG6 and a delay device D11 similar to the delay device D10 (being set by a resolver R2 and air speed servo AS1) and thence to a range gate FRG this range gate FRG incorporating the range RG and flip-flop FF1 of FIGURE 1 and a pulse from the pulse generator PG1 controlling the range gate FRG via the height delay HD but without the inter-position of the fixed delay D5 of FIGURE 1.

The form of the various height coders and delay devices will depend upon the amount of delay which must be imparted by each of these devices. Thus the height coders may conveniently be delay line type coders of the form described in the said Patent No. 659,007 or may, alternatively, be of the form described in the co-pending British application No. 11,602/58.

The delay devices D1, D2, D3 and D4 may consist of electronic delays such as phantastrons, the delays being controlled by a voltage as described in the co-pending application No. 791,924, the controlling factor in the present instance being the speed of the aircraft. A disadvantage of such an electronic delay is that when it has been triggered by a first pulse, a second pulse cannot be accepted until the delayed first pulse has been produced and the circuit has had an opportunity of reverting to its initial state. Thus, interlaced pulses cannot be handled. An alternative method of producing these delays is to select tappings on delay lines as described in the co-pending British application No. 11,602. In this arrangement a large number of pulses can be handled at any one time, but the delay is not infinitely variable, being altered in steps as the speed is varied. A disadvantage of these delay lines, in practice, is that where the delay is many times the pulse width of the signal, the delay lines tend to be bulky and heavy and under such circumstances it may be preferable to use a magnetic drum type of delay device.

Such a magnetic drum delay may comprise a cylinder or endless tape coated with magnetic material and rotated or moved at constant speed with a high degree of accuracy which may be derived from using a constant frequency oscillator, such as a 1 kc./s. crystal oscillator, feeding an amplifier which drives a synchronous motor for moving the magnetic material. The signal to be delayed is fed into a record head and is picked off by a playback head, the signal eventually being removed from the magnetic material by means of an erase head. Either the record head or the playback head is moved by the air speed servo AS1 or AS2 so as to vary the delay between the record and playback and, depending upon the permissible maximum and minimum effective spacings of the record and playback heads and the speed of movement of the magnetic material, almost any delay can be derived.

In the case where the delay is derived from a magnetic drum, it will be appreciated that by the provision of an adequate number of record heads and their associated playback heads, a single drum can serve to provide all the variable delays. Thus, in FIGURES 1 and 2 a single drum can provide the delays for the height coders HC1 and HC2, the height delay HD, the height gates HG1, HG3 and HG4, and can also serve as the delay devices D1 to D4. In FIGURES 4 and 5 such a single drum can provide the delays for the height coders HC1 and HC2, the height delay HD and the height gates HG5 and HG6 and can also serve as the delay devices D10 and D11.

The device described as a height gate is illustrated in FIGURE 6 and comprises an input which is connected to one input of a coincidence gate G1. This coincidence gate may, for example, be a pentode valve which is biased to cut-off by its control and suppressor grids so that the arrival of two coincident positive pulses is necessary to obtain a single pulse output. Thus the input is connected to one of these two biased grids. The input is also connected to a height coder delay HCD identical to that found in the other height coders and shown diagrammatically as a delay line and, therefore, the two pulses which are applied to the input will both be delayed by a time characteristic of height and will appear at the output of the height coder delay HCD to be fed to the other biased grid of the coincidence gate. It will be clear that if the incoming signal is height coded by a delay identical to the delay imparted by the height coder delay HCD, the second incoming pulse which is applied to the first input of the coincidence gate will arrive at the same time as the first delayed pulse passed through the height coder to the second input of the coincidence gate and in consequence a single output pulse will be provided, this output pulse being delayed by a time $t_h$ as compared with the first input pulse.

If an input pulse is passed through the height coder delay HCD, illustrated in FIGURE 6, and is then passed to an output connection via a diode such as that shown at X2 and the input pulse is also passed directly to the output through a diode such as that shown at X1, it will be clear that a single input pulse gives two output pulses, the second such pulse being delayed by a time $t_h$. Thus, the device operates as a height coder. It will be clear that the diodes X1 and X2 are necessary in the height coder but that they are not necessary in a height gate.

Throughout the description, use has been made of a two-pulse height code system in which the two pulses are separated by a time $t_h$ characteristic of the height of the aircraft and in the responder a height gate is used to combine these two pulses and is followed by a height coder to generate two more pulses which should be at identical spacings. It will be understood that it is possible to interrogate by using three pulses with identical separation between them and then in the responder to pass these three pulses through a height gate as previously described so as to obtain two pulses at the same separation if the height coding is correct. These two pulses are then transmitted as the response signal and in this way a height coder in the responder is obviated. Moreover, since the pulses were originally generated in the interrogator, the height gate of the interrogator which operates upon the response signal may operate more accurately. Alternatively the form of pulse delay coding described in the co-pending British application 11,602/58 may be adopted.

Although in general the description has been with reference to a pulse delay coding it may be desirable to vary the frequency of the radio transmission in accordance with height either as an alternative to the pulse delay height coding or additionally thereto. If frequency coding is used in this way the height sensitive devices H1 and H2 must, of course, be directly linked to the various receivers and transmitters to tune them and this is indicated by the chain dotted lines in FIGURES 1 and 2.

If the height coding is by way of frequency only, then it will be clear that referring to FIGURES 1 and 2 the height coders HC1 and HC2, the height delay HD and the height gates HG1, HG3 and HG4 are not necessary.

It will be understood that pilots do not continue to fly upon straight and level courses but frequently require to climb or dive and that they must have the facility of checking, before changing flight path in this way, as to whether the new height and course combination will be reasonably safe. In its most simple form this is easily achieved by means of offsetting the height gates and height coders so as to search at a height other than at which the aircraft is flying. This is diagrammatically illustrated in FIGURE 7 which is a broadside view showing an aircraft E travelling in the direction EF. The rectangle HB1, HB2, HB3, HB4 is a vertical section through the air space which may be searched in this way but it will be understood that the horizontal dimensions of this air space are not fixed but depend upon the relative speed and direction of approach of an intruding aircraft. By searching continuously all heights between the actual height and the finally intended height the pilot can receive assurance that during the first minute of climb there would be no other aircraft in the vicinity, but of course a continuous search must be carried out during the climb and preferably must be carried out in such a way that, during the climb, the height band is searched to correspond to the computed height some 30 seconds in advance. Thus at any moment the height at which the aircraft is actually flying is known to have been searched 30 seconds previously for a collision risk arising within one minute and if no response is being received at that moment the height change can safely continue.

In FIGURE 8 is illustrated the searching of a sloping air space which may be used as an alternative to the progressive height search as previously described, when the aircraft is changing height. Thus the intention is that when the aircraft is changing height it shall search a sloping air space extending in the direction of height change and which is correlated with the proposed rate of height change in such a way as to take into account aircraft within the dangerous sector. Thus an aircraft is shown at G as flying in a direction H and intending to change height to a lower height band so that in the forward sector the area of search is defined by the limits Q2, Q3, Q4 and Q5. It should be assumed that at the moment the aircraft has not yet initiated the height change but will almost at once start flying on a downwardly sloping path. Another aircraft is shown at J at the same height as the aircraft G and flying towards it, but it will be understood that if the height change of the aircraft G continues, there is no risk whatsoever of collision with the aircraft J for in the time necessary to close the gap between these two aircraft the aircraft G will have descended some hundreds of feet and so be clear in the vertical direction. In consequence the search does not reveal the aircraft J.

In this arrangement the height sensitive device is arranged so that the interrogation covers all heights between that defined by the line Q1, Q2 and that defined by the point Q4, but in addition the height gate is offset by a device which changes the height coding accepted according to the delay between interrogation and response, that is, according to the range of the responder. It may be convenient to search a space which is effectively broader at the remote end and accordingly the range of height codings accepted may be increased with range.

FIGURE 9 shows a circuit for obtaining this sloping height search and in the circuit of FIGURE 9, which is that of an interrogator, the delays inherent in the direction from which the reception is made are not shown in order to simplify the figure. In general, however, the circuit of FIGURE 9 should be considered to be a modification of that of FIGURE 1. Thus the pulse generator PG1 generates a train of pulses which are fed to the height delay HD1 and thence via a pulse widener PW1 to the transmitter TX1 and so to the associated antenna A5. In addition, pulses from the pulse generator PG1 pass directly to the transmitter TX1 operating on the frequency $f_1$. The function of the pulse widener PW1 is to operate upon the pulse passing through the height delay HD1 so as to cause it to be broadened so that the width of the emitted pulse covers a variation in height coding delays corresponding to a few thousand feet.

Thus it will be understood that all heights between the present height, as set by the height sensitive device H1, and a height some few thousand feet different are interrogated simultaneously and preferably the antenna A5 is directional forwardly. All aircraft in the height band being interrogated respond upon the frequency $f_2$ each with its own correct height coding. The response signals at the frequency $f_2$ are received on the antenna A1 and are passed to a receiver RX1. The detected pulses are fed via a pulse widener PW2 to one input of a coincidence gate G2. The detected pulses are also fed via a voltage controlled delay VCD and the pulse widener PW2 to a second pulse widener PW3 and to the second input of the coincidence gate G2. If the second pulse passing through the puse widener PW2 coincides with the first pulse delayed by the voltage controlled delay VCD and passing through the pulse widener PW3, then the coincidence gate G2 gives an output pulse which is passed to the range gate FRG. The voltage controlled delay VCD may be a phantastron circuit as described in the co-pending application 791,924 where the delay between the initiation of a voltage sweep and its termination, which is accompanied by an output pulse, depends upon an applied voltage. Thus the value of height codings accepted by the coincidence gate G2 depends upon the voltage applied to the delay VCD, such voltage being controlled as hereinafter described.

The pulse wideners PW2 and PW3 serve to broaden the band of height codings accepted so that height codings corresponding to values above and below the centre value set by the delay VCD are accepted. These pulse wideners are voltage controlled as will be described hereinafter.

The range gate FRG passes pulses within a certain time as hereinbefore described and therefore rejects responses coming from aircraft at too great a range. If a pulse is passed by the range gate FRG, the warner W is activated so as to inform the pilot so that the intended manoeuvre is dangerous.

The delayed pulses passing through the height delay

HD1 are delayed a second time by a height delay HD2, the height delays HD1 and HD2 being set by the height sensitive device H1 co that the pulse emitted from the height delay HD2 represents the earliest time at which a response can enter the range gate FRG, such a response corresponding to an aircraft at zero range and the same height. Thus the pulse from the height delay HD2 is caused to open the range gate FRG, the gate closing automatically after a fixed time.

The pulse from the height delay HD2 is fed to a delay device D12 which may be a phantastron, the delay being variable from zero upwards and being set by the pilot on a control LD such as a potentiometer in accordance with the distance he wishes to travel before commencing to climb or dive. Thus the pulse from the delay D12 represents the time for receiving a response from an aircraft at the chosen limit of level flight. The pulse from the delay D12 is fed to a sawtooth generator SG which generates a sawtooth voltage, that is to say a voltage changing linearly with time. The slope of this sawtooth and whether the voltage rises or falls is set on a control SC by the pilot, this control being calibrated in terms of angle or climb or dive, or as height change in feet per minute, and this sawtooth voltage is used to modify a voltage representing the present height of the aircraft.

Thus the height sensitive device H1 operates the slider S1 of a potentiometer P1 which is fed by a battery B1 and one end of the potentiometer P1 is fed by the sawtooth voltage so that the output from the slider S1 is a voltage representing the present height of the aircraft modified by the sawtooth voltage. This combined voltage is initially steady, representing the present height of the aircraft, and then rises or falls to represent the intended climb or dive and this voltage from the slider S1 is used to control the delay VCD. Thus the height coding of a response which is accepted by the coincidence gate G2 depends on the time when the first pulse of this response is fed into the delay VCD.

The pulse wideners PW1, PW2 and PW3 may, for instance, be phantastrons, each being triggered by an incoming pulse to produce an output pulse whose length depends upon the control voltage. The control voltage for the pulse widener PW1 is fixed, but that for the wideners PW2 and PW3 is the output voltage from the sawtooth generator SG so that before the sawtooth sweep is initiated these pulse wideners produce relatively narrow pulses which means that only those height codings for the response corresponding closely to the height of the interrogating aircraft will be accepted by the coincidence gate. After the sawtooth sweep is initiated however, the pulses produced by these pulse wideners become wider as the sawtooth voltage increases and this means that as the time increases, corresponding to a greater range for the responding aircraft, so the height band being searched increases in width thus allowing for the fact that a given rate of change of height cannot be maintained as accurately as can a constant height.

It is envisaged that when an aircraft carrying the apparatus shown in FIGURE 1 has received a reply to its interrogation which has activated the warning device W, this warning device may be caused to switch on more accurate direction finding and data exchange apparatus, for example as described in one of the said co-pending applications. The intention is that this further equipment will determine accurately the bearing of the other aircraft and will exchange with it or receive from it detailed coded information regarding its course and speed. Once in possession of this information, the interrogating aircraft may make a computation based upon relative velocity, bearing and range to determine firstly whether there is a serious risk of collision and secondly, if such collision risk exists, the time remaining before the collision will take place if no evasive action is taken. This time, which is known as the "escape time," is displayed to the pilot and it is anticipated that when first displayed to the pilot the escape time will be in excess of one minute although not greatly in excess. The value of escape time continues to be shown and will decrease steadily whilst the situation continues. At very high altitudes aircraft have reduced manoeuvrability and consequently an increased warning should be given under these conditions. This is readily achieved by coupling the height sensitive device H1 to the range gate RG so as to permit the acceptance of signals from a greater distance at very high altitudes.

Under certain circumstances, it will be very desirable to achieve the true range as opposed to the composite range provided by this invention, and it is merely necessary to switch out the various delays which have been incorporated so as to give normal responder action. It appears that this will be particularly desirable in the case of aircraft under ground control where the controller requires to know the true range of an aircraft. Responses may still be height coded as previously described and suitable provision can be made upon the ground either for interrogating all height bands sequentially using a receiver capable of receiving all responses or the interrogation may be to specific height band with the height coding in the receiver arranged to cooperate with the height coding impressed upon the interrogation.

Since it may not be desirable to switch out the various delays, it is possible to provide apparatus comprising, for example, a further height gate and a second height coder with a second transmitter and its associated antenna so as to give an undelayed response. Thus in the FIGURE 2 construction, the outputs from the two receivers RX3 and RX4 may be passed directly to a third height gate substantially as described with reference to the height gate of FIGURE 1 and may then be passed to a height coder, these height coded pulses being passed to a separate transmitter and then radiated from a omni-directional antenna upon a frequency $f_3$. In the interrogator, the output from a receiver is passed to a height gate similar to the height gate HG1 so as to provide a single pulse output occurring at a time $2t_0+2t_h+2d$ after the interrogation signal. As before, a delay similar to the delays D5 and HD can compensate for the delay $2d+2t_h$ and thus enable the correct range $t_0$ to be measured. The description of this system with reference to separate antennae should, of course, be understood to include the use of the same antenna with a diplexing device. This arrangement permits the aircraft to maintain the proximity warning facility even when giving the true range response.

The transmission of height coding and the determination of true range together permit the facility of automatic checking of glide path which term should include take-off climb angle and this checking may be done either by the ground at a control station or only in the aircraft itself.

Thus it will be known that the most desirable glide path for any specific aircraft gives a unique combination of range and height at any instant, and thus if an interrogating transmitter is located, for example, at the remote end of the runway and radiates, using a directional antenna, a signal which is preferably not height coded, the response from an aircraft must be a height coded response with no introduced artificial delays of unknown character. The delay due to range may be made to vary three height gates, one corresponding to the aircraft being too low and the others corresponding respectively to the correct height and too high. In accordance with the gate from which the signal is derived, the controller will know whether the aircraft is following its correct glide path as set by the height gates and may advise the pilot. It will be clear that instead of using height gates, range gates may be used alternatively. With slight modifications, the apparatus of FIGURE 9 may be used.

In order to obviate the slight delay by relaying the message from the controller to the pilot, the ground equipment may consist of a responder which is arranged to accept all height codings but to reply with its own height coding, and an aircraft interrogator measures the true range to set three height gates as described, and in accordance with the height gate through which the response passes the pilot will know whether he is on the correct glide path.

In an alternative arrangement, which is illustrated in FIGURE 10 the informtaion regarding the departure from the correct glide path is depicted to the pilot upon a centre-zero meter. Thus in the arrangement of FIGURE 10, the lefthand side represents the equipment in the aircraft for interrogation and for deriving the glide path information whilst the righthand side represents the responder on the ground.

In the interrogator, a pulse generator PG2 generates a pulse at intervals, each such pulse being used to key a transmitter TX3 to produce a pulse of radio frequency $f_3$ from an antenna A9. Each pulse is also fed to a delay device D13 and thence to a flip-flop FF2.

The responder includes an antenna A10 and a receiver RX9 for amplifying and detecting the received pulses and each received pulse is then fed to a height coder HC3 controlled by a height sensitive device H3 so as to produce a height coded response signal, the coding of which is characteristic of the height of the airfield. The response pulses are fed to a transmitter TX4 and radiated from an antenna A11 upon a frequency $f_4$. It will be clear that the actual height of the airfield cannot vary but the height sensitive device H3 is responsive to the ambient atmospheric pressure so as to co-operate with a similar height sensitive device H4 used in the aircraft.

It will be apparent that the glide path is computed upon the basis of height separation and distance from the desired point of touchdown and it will also be obvious that it will be extremely inconvenient to locate the responder at the desired point of touchdown but the spacing of the responder from the touchdown point is fixed and known. It will be convenient to locate the responder at the remote end of the runway or upon an extension therefo, and the antennae A10 and A11 may be directional.

In the aircraft, the pulses of frequency $f_4$ are received on an antenna A12 and are detected by a receiver RX10. Each pair of detected pulses is fed to a scale-of-two circuit ST where the first pulse of each pair initiates a gating pulse, whilst the second pulse terminates such gating pulse. Thus the length of the gating pulse is characteristic of the height of the airfield and this gating pulse is used to control a time demodulator TD1, which may be a constant current source, such time demodulator producing a voltage characteristic therefore of the airfield height. The aircraft carries a height sensitive device H4 which produces a shaft rotation characteristic of the atmospheric pressure around the aircraft and this shaft operates the slider S2 of a potentiometer P2 fed by a battery B2 so that the voltage between the slider S2 and the negative end N of the potentiometer P2 is characteristic of the aircraft height. The slider S2 is also connected to the positive output of the time demodulator TD1 so that the voltage between the earth line of the time demodulator and the line N is the difference between the two voltages characteristic of aircraft and ground height, and is, therefore, representative of the height of the aircraft above the ground.

The received pulses from the receiver RX10 are also fed to the flip-flop FF2, this flip-flop producing a gating pulse initiated by the pulse from the delay device D13 and terminated by the first pulse of each pair of pulses from the receiver RX10. This gate pulse, therefore, has a length characteristic of the time for reply and therefore characteristic of the distance of the aircraft from the responder. To allow for the distance from the responder to the desired point of touchdown, the delay device D13 is incorporated and is manually controlled by a distance setting device SD. The gating pulse from the flip-flop FF2 is passed to a time demodulator TD2 so that the voltage output therefrom, which is connected to a potentiometer P3, is characteristic of the distance to touchdown.

A slider S3 of the potentiometer P3 is set by a control SA so that the fraction of the total voltage appearing between the slider and the negative end of the potentiometer, which is connected to earth, is proportional to the sine of the desired glide path angle. Thus, the output voltage drawn from the slider S3 is proportional to the distance to touchdown multiplied by the sine of the glide angle. Since, however, the glide angle will normally be constant for any aircraft, being dependent upon its normal landing speed, it may be convenient to calibrate the control SA in terms of wind velocity in the direction of landing along the runway, this wind velocity being reported to the pilot by the ground controller so that the pilot can correct his glide path angle to take into account the wind.

The voltage between the slider S3 and earth continuously represents the correct height of the aircraft for the chosen glide angle and thus, if the aircraft is at the correct height, the voltages at the slider S3 and the point N will be equal and so these points are connected by a centre zero volt-meter M which will give a zero reading if the aircraft is at the correct height. On the other hand, if the aircraft is too high or too low, the magnitude and direction of the reading will indicate the departure from the desired glide path.

It will be apparent that the interrogator may be provided upon the ground and the responder in the aircraft, in which case the controller on the ground will report to the pilot his departure, if any, from the correct glide path.

This invention has been described throughout with reference to the equipment required in aircraft, but it will be understood that the invention may also be used for the prevention of collisions between ships in which case, of course, the height coding facility is not required. The delays which are introduced will also preferably vary with speed in the case of ships but it is convenient to set the delay for any given speed in accordance with the size of the vessel since this size affects the manoeuvrability of the vessel and, therefore, also affects the warning range required.

I claim:

1. Transponder ranging apparatus for vessels comprising a responder and an interrogator: in the interrogator, a transmitter to send an interrogation signal; in the responder, a receiver to receive the interrogation signal, delay means connected to the receiver to impart to the interrogation signal a delay in dependence upon the direction from which it was received, a transmitter to transmit a response signal and means passing said interrogation signal from said delay means to said transmitter to act as said response signal; and, in the interrogator, a receiver to receive the response signal, delay means connected to the receiver to impart to such response signal a delay in dependence upon the direction from which it was received, and means connected to such delay means and operative to accept the response signal in dependence upon the total delay between the interrogation signal and the delayed response signal.

2. Transponder ranging apparatus comprising a responder and an interrogator: in the interrogator, a transmitter for sending an interrogating signal; in the responder, a receiver to receive an interrogation signal, delay means connected to the receiver to impart to the interrogation signal a delay in dependence upon the direction from which it was received and upon the speed of the responding vessel, a transmitter to transmit a response signal, and means passing said delayed interrogation signal from said delay means to said transmitter to act as said response signal; and, in the interrogator, a receiver to receive the response signal, delay means connected to the receiver to impart to the response signal a delay in dependence upon the direction from which it was received and upon the speed of the interrogating vessel, and means connected to such delay means and operative to accept the response signal in dependence upon the total delay between the interrogation signal and the delayed response signal.

3. Transponder ranging apparatus for vessels comprising a responder and an interrogator: in the interrogator, transmitter means for sending an interrogation signal; in the responder, a forward-looking antenna and a rearward-looking antenna, receiver means fed by said antennae to receive the interrogation signal, delay means connected to said receiver means to impart to the interrogation signal a delay in accordance with the antenna by which it was received. a transmitter to transmit a response signal and means passing the delayed interrogation from said delay means to said transmitter to act as said response signal; and in the interrogator, a forward-looking antenna, a rearward-looking antenna, receiver means fed by said antennae to receive the response signal, delay means connected to said receiver, means to impart to such response signal a delay in dependence upon the antenna by which it was received and means connected to such delay means and operative to accept the response signal in dependence upon the total delay between the interrogation signal and the delayed response signal.

4. Transponder ranging apparatus comprising a responder and an interrogator: in the interrogator, a transmitter to transmit an interrogation signal; in the responder, a forward-looking responder antenna, a rearward-looking responder antenna, a first responder receiver connected to said forward-looking responder antenna, a second responder receiver connected to said rearward-looking responder antenna, first responder delay means connected to said first responder receiver, second responder delay means connected to said second responder receiver, means setting said first and second responder delay means in accordance with the speed of the responding vessel in such manner that as the speed of the responding vessel increases the delay imparted by the first responder delay means decreases, whilst that imparted by the said second responder delay means increases, a transmitter to transmit a response signal and means passing a signal selectively from said first and said second responder delay means to said transmitter to serve as a response signal; and, in the interrogator, a forward-looking interrogator antenna, a rearward-looking interrogator antenna, a first interrogator receiver connected to said forward-looking interrogator antenna, a second interrogator receiver connected to said rearward-looking interrogator antenna, first interrogator delay means connected to said first interrogator receiver, second interrogator delay means connected to said second interrogator receiver, means setting said first and second interrogator delay means in accordance with the speed of the interrogating vessel in such manner that as the speed of the interrogating vessel increases the delay imparted by the first interrogator delay means decreases whilst that imparted by the second interrogator delay means increases, and means operative to accept the response signal in dependence upon the total delay between the interrogation signal and the delayed response signal.

5. The apparatus of claim 4 including a gain setting receiver in said interrogator and in said responder, each such gain setting receiver being connected to the two antennae and serving to set the gain of the first and second receivers in accordance with the strength of the signal received, whereby a signal received strongly by one antenna and weakly by the other antenna is attenuated in the receiver connected to the antenna by which it is received weakly.

6. Transponder ranging apparatus for vessels comprising a responder and an interrogator: in the interrogator, a transmitter for sending an interrogation signal; in the responder, a directional rotatable antenna, a receiver connected to such antenna, means to impart to a signal received by such receiver a delay depending upon the resolved component of velocity of the responding vessel in the instantaneous direction of the antenna, a transmitter for transmitting a response signal and means passing said delayed interrogation signal to a said transmitter to act as said response signal; and, in the interrogator, a directional rotatable antenna, a receiver connected to said antenna to receive the response signal, means to impart to such response signal a delay in accordance with the resolved component of velocity of the interrogating vessel in the instantaneous direction of the antenna, and means connected to such delay-imparting means and operative to accept the response signal in dependence upon the total delay between the interrogation signal and the delayed response signal.

7. The apparatus of claim 3 in which the interrogation and response signals are height coded.

8. Transponder ranging apparatus for aircraft comprising the responder and an interrogator; in said interrogator, a pulse generator, a first height coder connected to such pulse generator and set in accordance with the height of the interrogator to transform each pulse from the generator into a double pulse separated by a time characteristic of height, and a first transmitter fed by said double pulses to transmit same as an interrogation signal; in the responder, a first forward-looking antenna, a first rearward-looking antenna, a first gain-setting receiver connected to both said first forward- and rearward-looking antennae, a first receiver connected to said first forward-looking antenna, a second receiver connected to said first rearward-looking antenna, a connection from said first gain-setting receiver to said first and second receivers to set the gain thereof, a first delay device connected to the output of said first receiver, a second delay device connected to the output of said second receiver, means to vary the delay imparted by said first and second delay devices so as to increase and decrease respectively in accordance with increasing speed of the responder, height gate means set in accordance with the height of the responder and fed by the output of said first and second delay devices, a second height coder set in accordance with the height of the responder and fed by the output of said height gate means, a transmitter to transmit a response signal and fed by the output of said height coder; and, in the interrogator, a second forward-looking antenna, a second rearward-looking antenna, a second gain-setting receiver connected to both said second forward- and rearward-looking antenna, a third receiver connected to said second forward-looking antenna, a fourth receiver connected to said second rearward-looking antenna, a connection from said second gain-setting receiver to said third and fourth receivers to set the gain thereof, a third delay device connected to the output of said third receiver, a fourth delay device connected to the output of said fourth receiver, means to vary the delay imparted by said third and fourth delay devices so as to increase and decrease respectively in accordance with increasing speed of the interrogator, height gate means set in accordance with the height of the interrogator, a range gate set to open in accordance with the delays imparted due to said first and second height coders and to close automatically, said range gate being fed with the output from said height gate, and a warning device connected to said range gate to be activated by signals passing therethrough.

9. Transponder ranging apparatus for aircraft glide path or take-off control comprising, in the aircraft, an interrogator including transmitter means for sending an interrogation signal; on the ground a responder including receiver means for receiving the interrogation signal and means passing a received signal to a transmitter for transmission as a response signal and for encoding such response signal with the height of the responder; and, in the interrogator, receiver means to receive the response signal, means to determine the range separation between the interrogator and the responder, means to determine the height separation between the interrogator and the responder, means set effectively in accordance with the desired glide angle and means to determine whether the ratio of height separation to range separation is in accordance with the desired glide angle and for signalling this to the pilot.

10. Apparatus according to claim 9 including means to modify the glide angle in accordance with the effective wind speed in the direction of approach.

References Cited in the file of this patent

UNITED STATES PATENTS 2,568,568     Stansbury _____ Sept. 18, 1951